United States Patent
Gillespie et al.

(10) Patent No.: US 12,227,190 B2
(45) Date of Patent: Feb. 18, 2025

(54) GRIP-FORCE SENSING AND SHAPE-CHANGING STEERING WHEEL

(71) Applicant: THE REGENTS OF THE UNIVERSITY OF MICHIGAN, Ann Arbor, MI (US)

(72) Inventors: Brent Gillespie, Ann Arbor, MI (US); Akshay Bhardwaj, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 88 days.

(21) Appl. No.: 17/328,497

(22) Filed: May 24, 2021

(65) Prior Publication Data

US 2021/0370953 A1 Dec. 2, 2021

Related U.S. Application Data

(60) Provisional application No. 63/029,840, filed on May 26, 2020.

(51) Int. Cl.
*B60W 40/08* (2012.01)
*G01L 5/22* (2006.01)

(52) U.S. Cl.
CPC ............. *B60W 40/08* (2013.01); *G01L 5/221* (2013.01); *B60W 2040/0872* (2013.01); *B60W 2540/223* (2020.02); *B60Y 2400/306* (2013.01)

(58) Field of Classification Search
CPC ......... B60W 40/08; B60W 2040/0872; B60W 2540/223; G01L 5/221
See application file for complete search history.

(56) References Cited

U.S. PATENT DOCUMENTS

| | | | |
|---|---|---|---|
| 9,452,678 B1* | 9/2016 | Boss | G06F 3/012 |
| 10,532,760 B1* | 1/2020 | Wang | B62D 1/08 |
| 11,242,081 B1 | 2/2022 | Kuehner et al. | |
| 11,465,666 B2* | 10/2022 | Ochi | B62D 1/183 |
| 2006/0284839 A1* | 12/2006 | Breed | B60W 50/16 |
| | | | 345/156 |
| 2014/0053371 A1* | 2/2014 | Feinstein | B25D 17/043 |
| | | | 16/430 |
| 2015/0032334 A1* | 1/2015 | Jang | B60W 10/20 |
| | | | 701/42 |
| 2016/0194022 A1* | 7/2016 | Williams | B62D 1/06 |
| | | | 74/558 |
| 2017/0351256 A1* | 12/2017 | Kumakiri | B60W 60/0053 |
| 2019/0300012 A1 | 10/2019 | Tsukada et al. | |
| 2019/0308655 A1* | 10/2019 | Ochi | B62D 1/181 |
| 2019/0375431 A1* | 12/2019 | Garcia | B62D 1/06 |
| 2020/0217666 A1* | 7/2020 | Zhang | G01C 21/383 |
| 2020/0298881 A1* | 9/2020 | Odate | B60W 60/0015 |

(Continued)

FOREIGN PATENT DOCUMENTS

| | | | | |
|---|---|---|---|---|
| CN | 202010160 U | * | 10/2011 | |
| CN | 112721938 A | * | 4/2021 | ............ B60W 40/08 |

(Continued)

*Primary Examiner* — Jelani A Smith
*Assistant Examiner* — Nada Mahyoob Alqaderi
(74) *Attorney, Agent, or Firm* — Harness, Dickey & Pierce, P.L.C.

(57) ABSTRACT

A grip force sensing and shape-changing steering wheel configured to serve as an intuitive means of communication between a human driver and automatic driving system or driver assist system.

11 Claims, 3 Drawing Sheets

(56) References Cited

U.S. PATENT DOCUMENTS

2020/0309594 A1\* 10/2020 Wei .......................... A61B 5/18
2021/0147000 A1    5/2021 Olsen
2021/0370953 A1\* 12/2021 Gillespie ................. G01L 5/221
2022/0185358 A1\*  6/2022 Szczerba .................. B62D 1/06

FOREIGN PATENT DOCUMENTS

| CN | 114194197 A | * | 3/2022 | ............ B60W 40/08 |
| CN | 114516324 A | * | 5/2022 | |
| IN | 201921020740 A | * | 10/2019 | |
| JP | 2017154623 A | * | 9/2017 | |
| JP | 2021049894 A | * | 4/2021 | |
| WO | WO-2020000137 A1 | * | 1/2020 | ............. G01S 17/89 |

\* cited by examiner

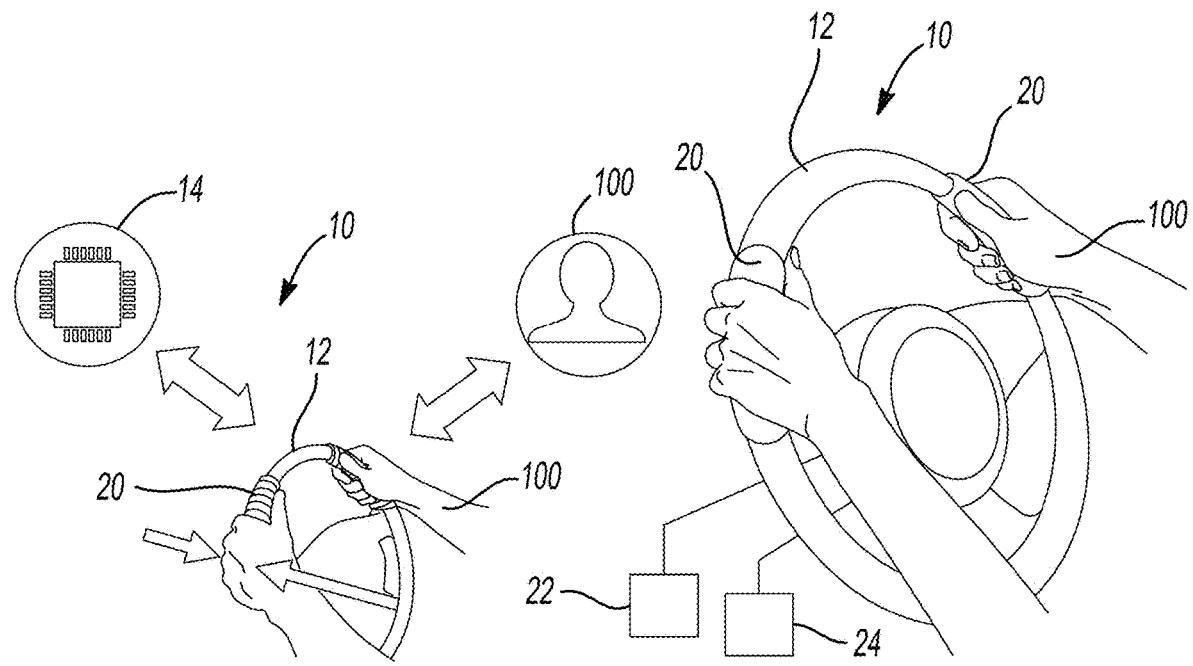
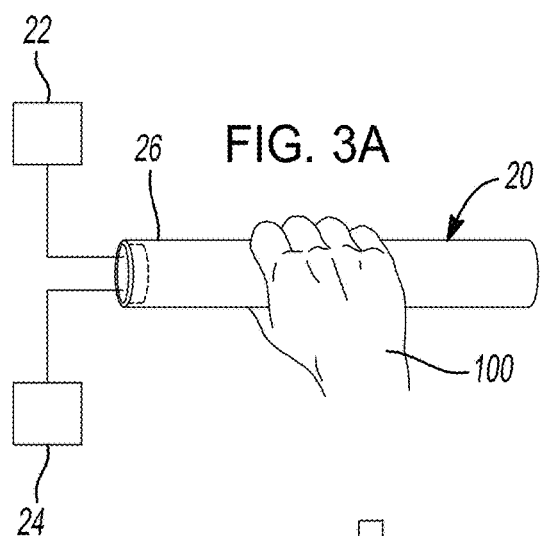
FIG. 3A
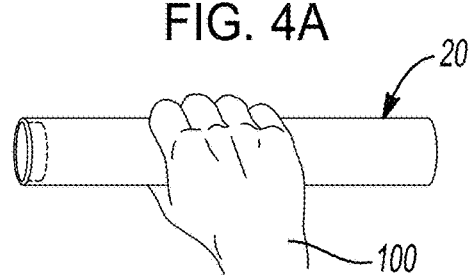
FIG. 4A
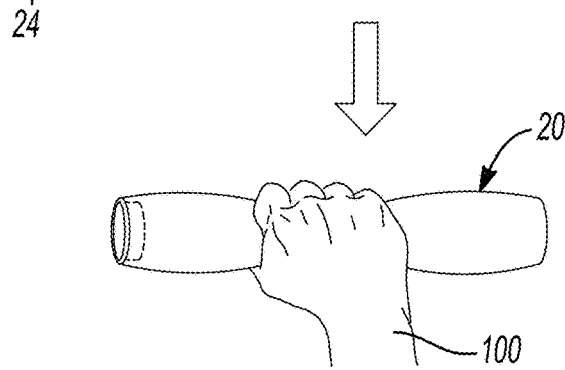
FIG. 3B
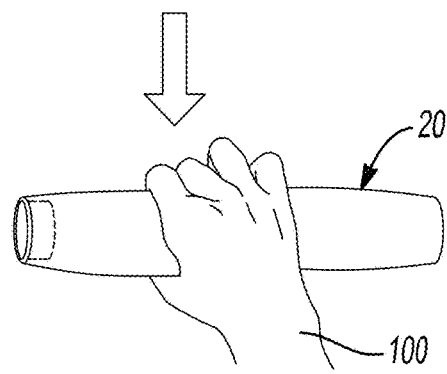
FIG. 4B Fluid Port Mechanical Port

GRIP-FORCE SENSING AND SHAPE-CHANGING STEERING WHEEL

CROSS-REFERENCE TO RELATED APPLICATIONS

This application claims the benefit of U.S. Provisional Application No. 63/029,840, filed on May 26, 2020. The entire disclosure of the above application is incorporated herein by reference.

FIELD

The present disclosure relates to a grip-force sensing and shape-changing steering wheel.

BACKGROUND AND SUMMARY

This section provides background information related to the present disclosure which is not necessarily prior art. This section provides a general summary of the disclosure, and is not a comprehensive disclosure of its full scope or all of its features.

According to the principles of the present teachings, a grip force sensing and shape-changing steering wheel is disclosed to serve as an intuitive means of communication between a human driver and automatic driving system or driver assist system of a vehicle. In some embodiments of the present teachings, timely and transparent negotiation of control authority between a driver of the vehicle and its associated automation system(s) is provided, especially during control transitions between driver controlled and automation system controlled. In the past, this transition has proven problematic and led to mishaps in application domains, such as aviation. The steering wheel, according to some embodiments of the present teachings, can support mutual awareness on the part of the driver and the automation system regarding each other's control actions, the current delegation of control authority, and future control intentions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates a grip-force sensing and shape-changing steering wheel according to the principles of the present teachings;

FIG. 2 illustrates an enlarged view of the grip-force sensing and shape-changing steering wheel system according to the principles of the present teachings;

FIGS. 3A and 3B illustrate human driver's hand gripping a grip section of the steering wheel (3A) and applying a gripping pressure (3B);

FIGS. 4A and 4B illustrate human driver's hand gripping a grip section of the steering wheel (4A) and a communicated inflation of the grip section (4B);

Figure 7:
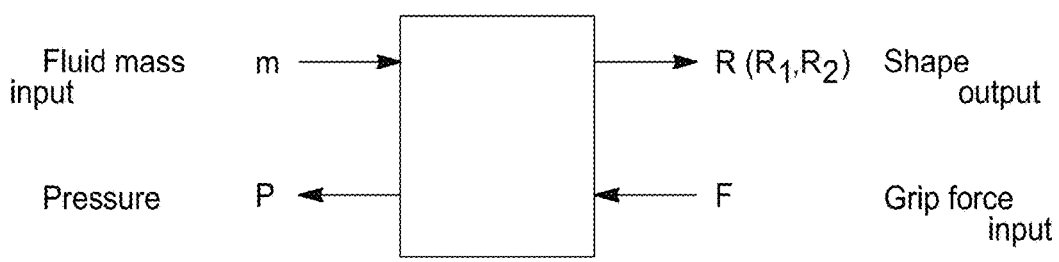

FIG. 7 the inputs and outputs of the grip-force sensing and shape-changing steering wheel system.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

During control transitions in semi-autonomous driving, clear communication must be established to support driver/automation interactions. Channels of communication must be available to inform each agent of the other's control actions and control authority (for example, which agent has control or has more control). According to the present teachings, fast and intuitive transitions of control authority can be facilitated by transitioning authority to and from the automation system in a manner that mimics cooperative manipulation between two humans—just like two humans pushing and pulling on an object can read each other's intentions through haptic feedback, the human driver and the automation system can read each other's control intentions (e.g. steering angle command) by feeling the other agent's torque at the steering wheel. Each agent can read each other's control authority by feeling the impedance (e.g. torque/motion relationship or roughly, stiffness). However, two cooperating humans will typically supplement their pushing and pulling by transmitting signals across additional communication channels, often leading to significant improvements in performance on the shared task. In this spirit, according to the present teachings, a grip-force sensing and shape-changing steering wheel can provide an additional communication channel between the human driver and automation system that will significantly improve driving performance.

In some embodiments, the present teachings are rooted in the observation that human drivers increase their grip on the steering wheel either when they want to take over the control of the vehicle or when they are surprised by something that they encounter on the road. Therefore, in some embodiments, to ensure safe and comfortable driving, a well-designed automation system may have three objectives 1) sense the grip force applied by the driver, 2) understand the traffic situation and decide whether to override or acquiesce to the human control action, and 3) inform the driver of its decision. While the second objective requires advanced software algorithms, the first and third objectives can be addressed by embedding sensors and actuators on or in the steering wheel to make the communication at the steering wheel more intuitive.

In some embodiments, a shape-changing steering wheel with pressure or grip force sensing holds particular promise in creating such an intuitive interface. A driver squeezing the steering wheel to request greater control authority who feels the steering wheel expand in response will immediately know that the takeover request was not granted. On the other hand, if the steering wheel deflates under an increase in grip, the driver will immediately know that the takeover request was granted and that they—the human driver—are now in control.

Meanwhile, the pressure changes in the wheel can be used to measure the grip force applied by the driver. Advantageously, in some embodiments, the axis of grip force and shape change can be orthogonal to the axis of control (the steering angle and torque), thereby ensuring the interface is information-rich and independent of the actual steering task.

In the academic and patent literature, various steering wheels have appeared that can measure the grip force or can provide feedback to the driver. The feedback in these steering wheels is provided in the form of visual or haptic cues, and the role of feedback, generally, is to inform the driver about the correct steering action. Sometimes, visual or haptic feedback is used to inform the driver whether they are in control at a given time. However, these information display functions (whether haptic or visual feedback) have not previously been combined with sensing in the same haptic/motor axis. Particularly in the context of driving, where the visual sense is already heavily loaded, haptic feedback has been found to be more helpful than visual feedback. Haptic feedback can come in the form of vibration, skin stretch, and shape change.

In some embodiments, the present teachings uses shape change in the steering wheel because feedback through shape change communicates more information (visual and tactile) than other methods and, more importantly, shape change can be placed in the same axis as the grip force sensing. Thus, the present steering wheel combines haptic display with grip force sensing in the same axis, which has not appeared in the past. Moreover, unlike other wheels, the steering wheel of the present teachings is developed to communicate control authority and thereby to make the transitions of control authority between the human driver and the automation system smoother and more intuitive.

In summary, visual, audio, and, to some extent, haptic modalities have been explored in current advanced driver assist systems (ADAS); however, previous interfaces have not proposed bidirectional communication in two distinct axes (steering axis and grip axis). Given the physical contact between the driver's hands and the steering wheel, haptics has significant potential for serving as an intuitive means for negotiating control authority in semi-automated driving.

In some embodiments, as illustrated in FIGS. 1-5C, a grip-force sensing and shape-changing steering wheel system 10 is provided having a steering wheel 12 rotatable about a steering wheel axis SWA and a control system 14 operably coupled thereto. The steering wheel axis SWA is defined by the axis generally aligned with a steering column of a vehicle, about which the steering wheel 12 is configured to rotate in response to steering input from a human driver 100.

The steering wheel 12 of the steering wheel system 10 includes one or more gripping sections 20 for receiving the hands of the human driver 100. The one or more gripping sections 20 generally define a grip axis or plane GA defined by the axis or plane (either linear or circular) upon which the human driver 100 grips and/or tactilely engages the steering wheel 10. In some embodiments, the grip axis or plane GA is generally orthogonal to the steering wheel axis SWA.

In some embodiments, steering wheel system 10 comprises one or more grip sections 20 disposed on or incorporated in steering wheel 12. Each of the one or more grip sections 20 is configured to be gripped by the human driver 100 during the course of manipulation of the steering wheel 12 during vehicle operation and control. In some embodiments, each of the one or more grip sections 20 comprises a grip pressure sensing system 22 and a grip section shape changing system 24, such that the grip pressure of the human driver 100 can be sensed by the grip pressure sensing system 22 (input) and command communication can be communicated to the human driver 100 via a changing shape of the grip section shape changing system 24.

In some embodiments, grip section 20 can comprise an inflatable section 26, such as an active fluid bladder embedded into the steering wheel 12. In this way, a fluid, such as air, can be used to inflate the inflatable section 26 and an internal pressure of inflatable section 26 can be monitored by a pressure sensor 28 operably coupled with inflatable section 26. Therefore, in some embodiments, grip pressure sensing system 22 can comprise inflatable section 26 and pressure sensor 28 that is configured to monitor a grip pressure of the human driver 100. Likewise, inflatable section 26 can be inflated and/or deflated via a pressure input/output system 30. Therefore, in some embodiments, grip section shape changing system 24 can comprise inflatable section 26 and pressure input/output system 30 that is configured to inflate and/or deflate the grip section 20 to provide communication to human driver 100.

In this way, it should be appreciated that two-way communication can be achieved via grip section 20; that is, 1) grip pressure communication from the human driver 100 to the steering wheel system 10 and 2) inflation/deflation communication from the steering wheel system 10 to the human driver 100. Moreover, it should be appreciated that, in some embodiments, this two-way communication is achieved in or along the direction of grip axis or plane GA, which is independent or separate from the steering wheel axis SWA.

Figure 6A:
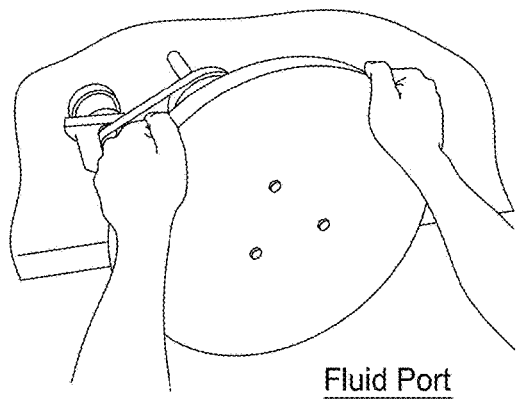
FIGS. 6A-6B illustrate another grip-force sensing system.
Figure 6B:
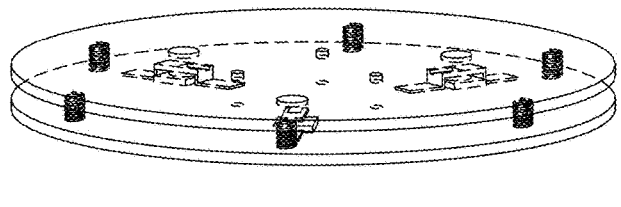

In a prototype, as illustrated in FIGS. 6A-6B, a grip force sensing wheel using hall-effect sensors was provided. The prototype featured two spring-loaded plates with embedded magnets and Hall Effect sensors. An applied grip force reduced the distance between the spring-loaded plates. The grip force was then measured by sensing the change in displacement between the two plates using the Hall Effect sensor. While this prototype could sense the grip force, it did not provide a means to change the shape of the steering wheel.

Figure 5A:
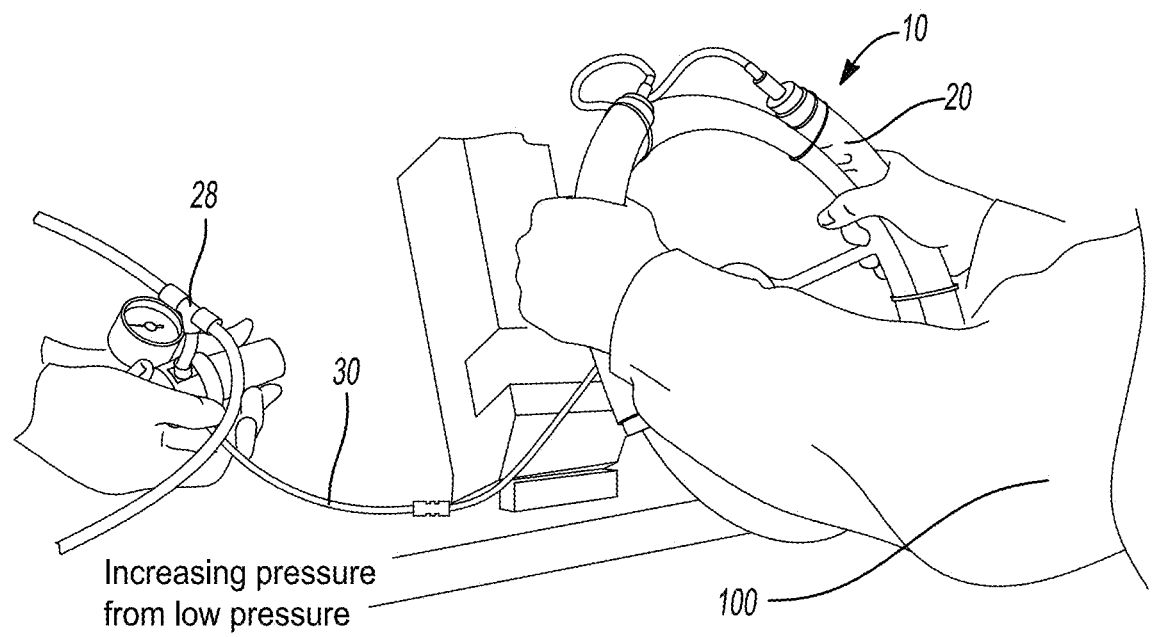
FIGS. 5A-5C illustrate a prototype of the present grip-force sensing and shape-changing steering wheel system with increasing pressure (5A), squeezing (5B) and decreasing pressure (5C)
Figure 5B:
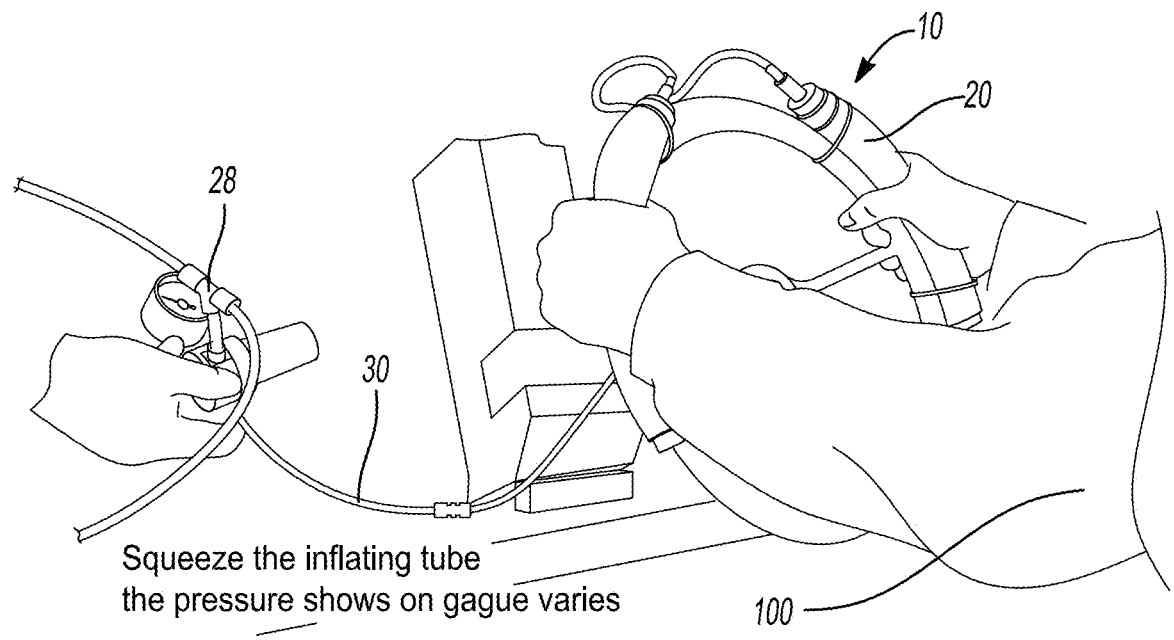
Figure 5C:
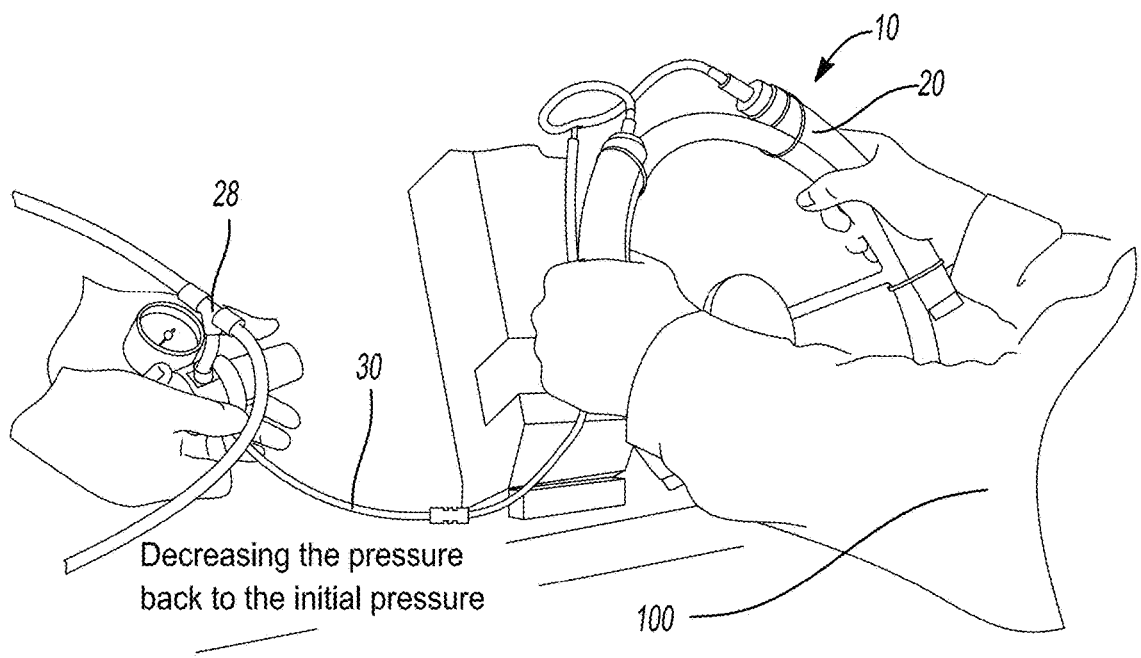

In accordance with the present teachings, a prototype was built that realized both shape change and grip force sensing through a set of active fluid bladders embedded in the steering wheel, as illustrated in FIGS. 5A-5C. The mass of fluid (air or water) displaced into the bladders (driven using remote motorized cylinders) produces a change in shape to be sensed by the driver (see FIG. 5A). The monitoring of fluid pressure in the same bladder will provide a reading of the driver's grip force given known fluid displacements and bladder mechanics (see FIG. 5B), and validated fluid system models support decoupled actuation and sensing.

In some embodiments, when required to maintain safety, rapid transfers of authority may be invoked by the automation system and communicated with an expansion of the steering wheel. Once the situation is resolved, the driver may request a return of control authority by squeezing the steering wheel, and this request would be acknowledged with a reduction (see FIG. 5C) or denied with an expansion in grip diameter (see FIG. 5B). Delegation of authority, as communicated by steering wheel shape, could be accompanied by changing impedance in the axis of steering, with high impedance corresponding to high automation authority.

The effect of elasticity in the bladder matrix, both under the hands and not under the hands of the driver (where it is free to expand) can be taken into account to relate sensed pressure to applied grip force. In some embodiments, the system has a two-port architecture with four variables (see FIG. 7). The mass of the fluid and the grip force applied by the human are inputs to the system, whereas the fluid pressure and shape change are the outputs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A steering wheel system to establish two-way non-visual, non-verbal communication between a human driver and a vehicle automation system of a vehicle, the steering wheel system comprising:
   a steering wheel of the vehicle;
   a grip sensing system operably coupled with the steering wheel, the grip sensing system configured to sense an increase and a decrease in a grip force of the human driver upon the steering wheel to detect a signal, change of state, or intention from the human driver and communicate the signal, change of state, or intention to the vehicle automation system, the vehicle automation system configured to determine a transfer state of control authority of the vehicle; and
   an active shape-changing system operably coupled with the steering wheel, the active shape-changing system configured to physically change the steering wheel between an enlarged inflated position and a contracted deflated position, the active shape-changing system configured to indicate the transfer state of control authority to the hands of the human driver via the physical change in response to the detected signal, change of state, or intention from the human driver.

2. The intuitive steering wheel system according to claim 1 wherein the grip sensing system is configured to measure a force.

3. The intuitive steering wheel system according to claim 1 wherein the grip sensing system is configured to measure a temporal parameter.

4. The intuitive steering wheel system according to claim 1 wherein the grip sensing system is also configured to render the physical change of the steering wheel for the driver to sense.

5. The intuitive steering wheel system according to claim 1 wherein an axis of the grip sensing and shape-changing system is orthogonal to the steering wheel axis.

6. The intuitive steering wheel system according to claim 1 wherein the grip sensing system comprises a bladder system.

7. The intuitive steering wheel system according to claim 1 wherein the grip sensing system comprises a fluidic system.

8. The intuitive steering wheel system according to claim 1 wherein the grip sensing system comprises sensors.

9. The intuitive steering wheel system according to claim 1 wherein the grip sensing system comprises Hall Effect sensors.

10. The intuitive steering wheel system according to claim 1 wherein the grip sensing system and the shape-changing system are collectively operable in a single axis.

11. The intuitive steering wheel system according to claim 10 wherein the single axis is orthogonal to an axis of operation of the steering wheel.

* * * * *